Aug. 29, 1967 J. KURTZ 3,338,598
COUPLING METHOD AND DEVICES FOR LINED PIPE
Filed Dec. 29, 1964 2 Sheets-Sheet 1
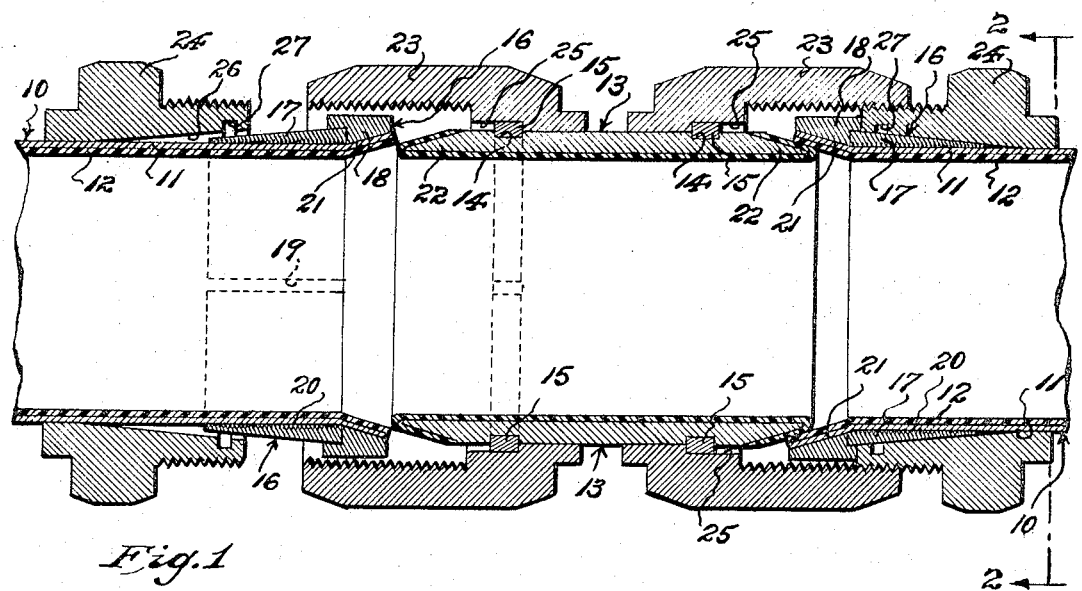
Fig.1
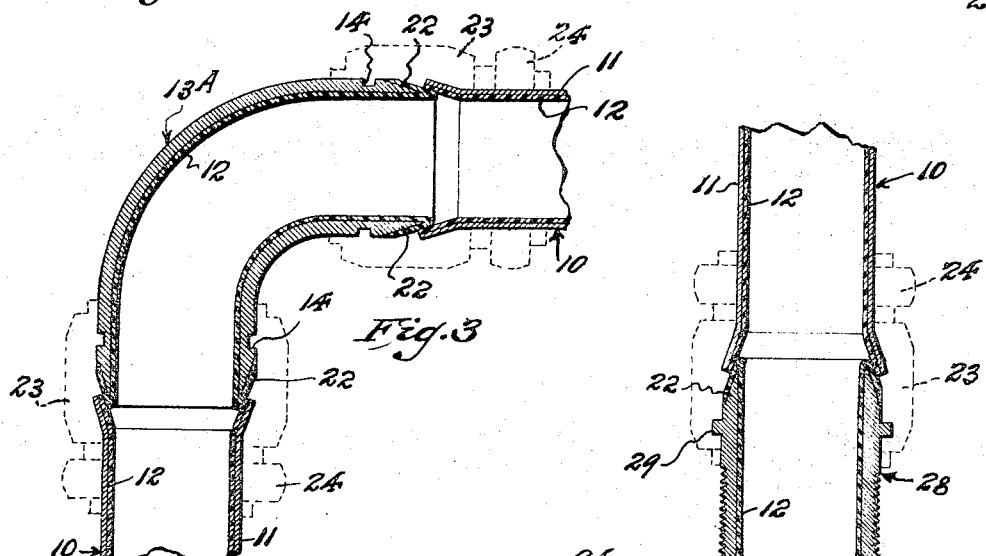
Fig.3
Fig.4
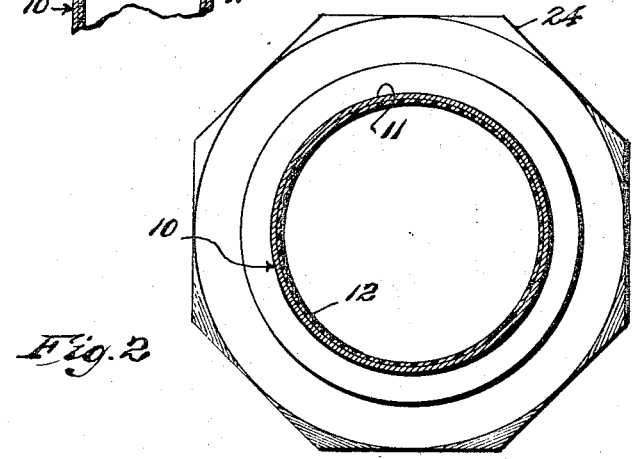
Fig.2
INVENTOR.
John Kurtz,
BY Richards and Cifelli,
Attorneys Aug. 29, 1967         J. KURTZ         3,338,598
COUPLING METHOD AND DEVICES FOR LINED PIPE
Filed Dec. 29, 1964                 2 Sheets-Sheet 2
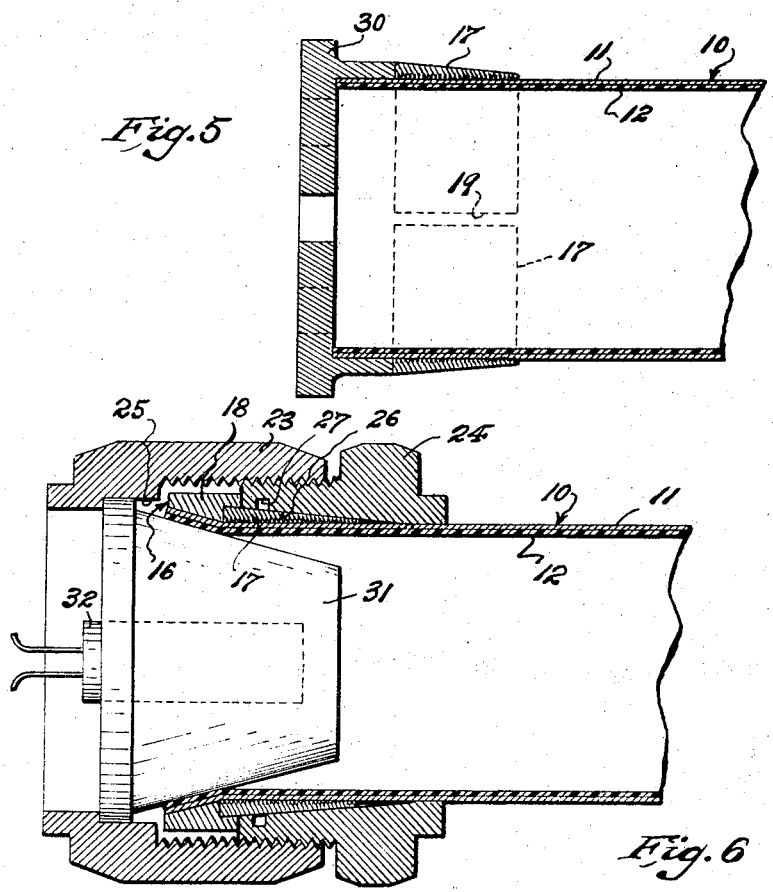
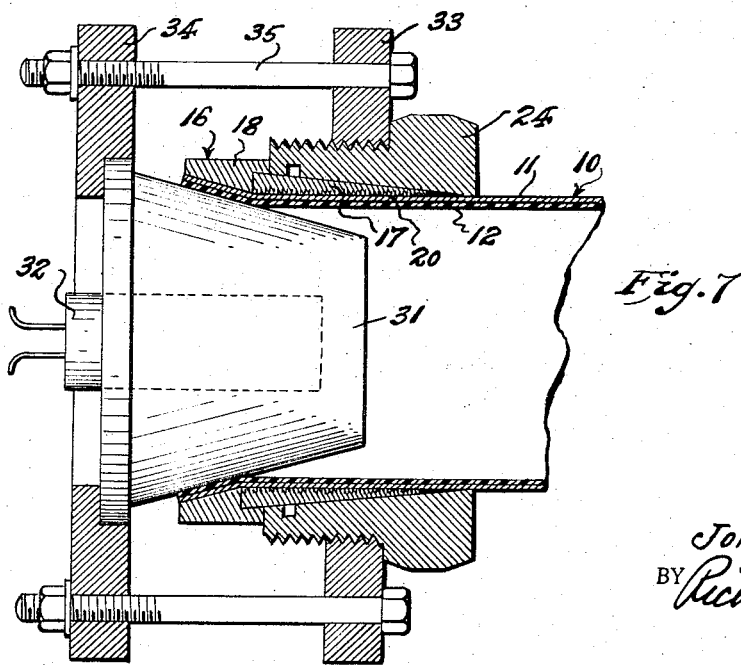
INVENTOR.
John Kurtz,
BY Richards and Cifelli,
Attorneys

United States Patent Office 3,338,598
Patented Aug. 29, 1967

3,338,598
COUPLING METHOD AND DEVICES
FOR LINED PIPE
John Kurtz, 7480 Elaine Terrace,
Union, N.J. 07083
Filed Dec. 29, 1964, Ser. No. 421,812
3 Claims. (Cl. 285—55)

The present invention relates to a close coupling method and close coupling devices for lined pipes of deformable or ductile metal and, more particularly, to an improved method and improved coupling devices of this type adapted for use in the field. Close coupling devices are those in which the coupling members are spaced a relatively short or minimal distance apart, thus permitting joining of pipes in a short length thereof or in restricted spaces.

In recent years, pipes lined with chemically inert materials, such as rubber and synthetic plastics, have come into widespread use, particularly in applications for which ordinary metal pipes would be unsuitable due to their lack of resistance to corrosion or other chemical attack. Plastic-lined metal pipes are also useful in applications for which pipes composed entirely of plastic are unsuitable, as, for example, under conditions of superatmospheric or subatmospheric pressure, or at elevated temperatures at which thermoplastic pipes soften and lose their mechanical strength.

Many satisfactory methods and devices are known for joining unlined pipes composed entirely of plastic, ductile metal, or hard metal, either in the manufacturing plant and shop, or under field conditions. When such methods and devices are used for connecting lined pipes, however, it is necessary to apply a protective coating of plastic, for example, to the inside of the joint after the lengths of lined pipe are assembled. This difficult procedure cannot, of course, be carried out in the field and, therefore, the use of ready-lined pipes has been seriously limited in this respect. A method has been suggested for joining lined hard metal pipes in the field, but this method requires machining away a portion of the thick hard metal wall of the pipe, near the end to be joined, without destroying the adjacent plastic lining. This practice suffers from the obvious disadvantage that it requires careful machining in the field and, moreover, fails to provide a method for coupling lined pipes having relatively thin walls of ductile metal. For such thin walled ductile metal pipes, it has previously been necessary to prefabricate the desired piping structure and coat its inner surfaces with plastic at the manufacturer's plant.

It is a primary object of the present invention, therefore, to provide a method and means for forming, under field conditions, a lined close coupled joint between a section of lined pipe and other lined conduit, vessel or fitting.

It is another object of the present invention to provide a method and means for forming a lined close coupled joint between lined metal pipes without the necessity of machining the metal pipes.

It is still another object of the present invention to provide a method and means for quickly forming a lined close coupled joint with a lined metal pipe, by relatively unskilled workmen employing only conventional wrenches and flaring tools.

It is yet another object of the invention to provide an easy and economical method and means for making close coupled flared field connections, wherein the coupled portions of the pipe or fitting are adequately supported against deformation and fracture.

It is still another object of the invention to provide a method and means for close coupling lined pipe, wherein the end of the lined pipe to be flared and coupled is locked securely into a reinforcing coupling member prior to flaring, thus preventing splitting, rupture, or other damage to the pipe or its lining during the flaring operation.

It is another object of the invention to provide a method and means for close coupling lined pipes which provides a lined, reliable, shock resistant joint, stronger than the pipe itself, and which is not subject to damage or leakage in use.

It is still another object of the invention to provide a method and means for close coupling lined pipe which are adapted to be employed in conjunction with any conventional pipe fitting, such as flanges, elbows, T's, valves and the like.

The above and other objects of this invention will be understood from a reading of the following description of illustrative embodiments thereof shown in the accompanying drawings in which:

FIG. 1 is a cross sectional view taken through the longitudinal axis of a close coupling device of the invention joining two sections of lined pipe;

FIG. 2 is an elevational view of the male coupling member of the close coupling device, taken on the line 2—2 of FIG. 1 in the direction of the arrows;

FIG. 3 is a cross sectional view taken through the longitudinal axis of close coupling device of the invention including an intermediate elbow joining two sections of lined pipe;

FIG. 4 is a cross sectional view through the longitudinal axis of a close coupling device of the invention joining a length of lined pipe to an externally threaded fitting;

FIG. 5 is a cross sectional view through the longitudinal axis of a section of lined pipe, fitted with the tapered anchoring ferrule of the close coupling device of FIG. 1, and a spacing element for said ferrule;

FIG. 6 is a cross sectional view through the longitudinal axis of a section of lined pipe, showing a flaring plug retained and actuated by means of the female coupling element of the device of FIG. 1; and FIG. 7 is a cross sectional view through the longitudinal axis of a section of lined pipe showing a flaring plug retained and actuated by heavy duty flanges.

Corresponding reference characters are employed in the several figures of the drawings to identify like parts.

Referring now to the drawings in greater detail, and initially to either end of FIG. 1 thereof, a section of lined pipe 10, consisting of a pipe 11, composed of deformable or ductile metal, and having a plastic lining 12 bonded to the interior surface thereof, is joined to a coupling sleeve 13. The coupling sleeve 13 consists of a cylindrical pipe-like metal body element, open at both ends, which is also provided with a bonded plastic lining 12. The metal body element of the coupling sleeve 13 is provided with an annular channel 14 which has snap-fitted therein, a split ring member 15 having a diameter such that the ring provides an annular, radially projecting flange around the circumference of sleeve 13. The sleeve 13, as shown in FIG. 1, must have a metal wall thickness sufficient to provide adequate mechanical strength despite the annular channel 14. Therefore, if sleeve 13 is to be as strong as the main pipe its wall must be about twice as thick as the wall of the pipe in order to afford a channel 14 of adequate depth.

An anchoring ferrule 16 is provided to encircle the external circumference of the lined pipe 10 adjacent the end to be coupled. The ferrule 16 has a portion 17 which is externally tapered longitudinally so that its larger end is adjacent the end of the pipe 10 to be coupled. The anchoring ferrule 16 may also be provided with an optional collar 18 as shown in the embodiments of FIGS. 1, 6 and 7, or the collar 18 may be omitted as shown in FIG. 5. A longitudinal split 19 is provided in the tapered portion 17 of the collar 16 to facilitate assembly of the coupling device by sliding the ferrule onto a length of unflared pipe 10. The split 19 also adapts the ferrule to be subsequently clamped onto the pipe by radial constriction of the tapered portion 17. The frictional engagement of the anchoring ferrule 16 with the metal surface 11 of the pipe 10 on radial constriction is enhanced by providing the internal surface of the tapered portion 17 with fine threads 20. The collar 18, if present, is provided with an inwardly inclined surface 21 terminating at its inner end at the threads 20 of the cylindrical inner surface of the portion 17 of the ferrule.

The coupling sleeve 13 is provided with tapered portions 22 adjacent each of its open ends. The plastic lining 12 extends in a continuous, unbroken film from the internal surface of the sleeve over the edge at the open ends thereof and back along the exterior surface to cover the tapered portions 22. The end of the lined pipe 10 is flared outwardly from a point approximately coincident with the larger end of the tapered portion 17 of the anchoring ferrule 16. The angle of flare of the lined pipe 10 is preferably, but not necessarily, the supplement of the angle of the tapered portions 22 of the sleeve 13, i.e., the two angles preferably total 180°. The outwardly flared end of the lined pipe 10 is positioned over the end of the coupling sleeve 13 with the internal plastic lining 12 of the pipe in direct contact with the external plastic coating 12 on the tapered portion 22 of the sleeve. The sleeve 13 and pipe 10 are retained and tightly held together in this position by engagement of the threaded portions of the female and male coupling members 23 and 24, respectively.

The female coupling member 23 is a fitting open at both ends and provided with a counter bored socket 25 to receive, closely surround, and engage the split ring 15 in the annular channel of the coupling sleeve 13. The annular channel 14 in sleeve 13 is spaced from the inner end of the tapered portion 22 thereof in order to afford a full sleeve diameter segment between the channel and the tapered portion to provide adequate mechanical strength.

The male coupling member 24, which is also open at both ends, has a longitudinally tapered bore hole 26 having an annular slot 27 spaced from, but adjacent to, the end of the member 24 engaged in member 23, which slot facilitates disassembly of the joint when desired by breaking any vacuum which has formed between the members 24 and the surface 17 of ferrule 16.

It should be noted here that certain critical spacial relationships are necessary for assembling the coupling devices of the present invention. For purposes of explanation the distance from the inner end of the tapered portion 22 of sleeve 13 to the limit of travel of the coupling element 23 onto the sleeve 13 will be referred to as distance (A). The dimension of the female coupling element 23 between the inner end of the threaded bore and the non-threaded end will be referred to as distance (B). The distance from the inner end of the tapered portion 22 of sleeve 13 to the inner end of the channel 14 or, more accurately, the inner end of the split ring 15 in channel 14, will be referred to as distance (C). Having these distances in mind it will be seen that when there is a limit to the distance of travel of the coupling element 23 onto the sleeve 13, such as a second adjacent element 23 as shown in FIG. 1, in order to permit installation of the split ring 15, it is necessary that the distance (A) less the distance (B) must be a distance (D) which is at least slightly greater than the distance (C). If this were not so, the non-threaded portion of the element 23 adjacent the inner end of the threaded portion would obstruct the channel 14 and prevent installation of the split ring 15.

In the method of coupling lined pipes according to the present invention, a male coupling member 24 is first placed over the unflared end of a section of lined pipe 10 and slidably moved to an out of the way position along the pipe. An anchoring ferrule 16 is then placed on the same end of the pipe 10. If the ferrule 16 is provided with an optional collar 18, the face of the collar is positioned flush with the end of the pipe. On the other hand, if the ferrule 16 does not have a collar 18, a separate spacing element 30, having a diameter and length the same as a collar 18, is temporarily placed over the end of the pipe 10 flush with the portion 17 of the ferrule as shown in FIG. 5, thus properly locating the ferrule for installation.

The ferrule 16, or more accurately the portion 17 thereof, is then firmly anchored to the pipe 10 by radially constricting the portion 17 and causing it to tightly engage the metal outer shell 11 of the pipe. This may be accomplished by any suitable means, as by clamping the portion 17 in the jaws of a vise, for example, but the simplest practice is to use the coupling device itself as the constricting means. When the ferrule is provided with a collar 18, this is done by placing a conical flaring plug 31 in the open end of the pipe as shown in FIG. 6 and holding it in place by means of the female coupling member 23, which is threaded onto the male coupling member 24. The flange of the flaring plug is adapted to fit into the counter bored socket 25 of the member 23. It will be seen that as the coupling members 23 and 24 are screwed together, the portion 17 of the furrule will be forced into the decreasing-diameter bore hold 26 in member 24 thus radially constricting the portion 17 and causing it to tightly grip the pipe 10. The anchoring ferrule 16 is composed of a relatively hard and inelastic but deformable metal which tends to retain the conformation obtained on constriction of the ferrule. As noted above the fine threads 20 on the inner surface of the portion 17 of the ferrule increase its friction. It will be seen, therefore, that the constriction of the ferrule serves to anchor it firmly and immovably where it it placed on the pipe 10.

When the collar 18 is omitted and only portion 17 of the ferrule is used, a metal head space filler (not shown) is employed which fits into the socket 25 in the female coupling element 23 and effectively fills the space between the bottom of the main bore hole of element 23 and the spacing element 30 in the end of the pipe 10. The head space filler thus serves the function of the sleeve 13 or flare plug 31 in providing a rigid intermediate filler to permit the coupling element 23 to draw the element 24 toward it and thus constrict the portion 17 of the anchoring ferrule as described above.

Having securely fixed the anchoring ferrule 16 or 17 onto the pipe 10, the next step is to flare the end of the pipe. This may be accomplished in many cases by simply tightening the assembly of FIG. 6 by screwing the coupling members 23 and 24 together until the flaring plug 31 has deformed the pipe 10 to the desired degree. This simple procedure may be employed when the pipe 10 is composed of a relatively thin walled metal pipe 11 and a thin plastic lining 12. When the plastic lining 12 is thicker, however, or is composed of a thermoplastic deformable only with difficulty when cold, the flaring process is facilitated by heating the flaring plug 31 by means of an electrical heating element 32, the leads of which are connected to a suitable source of electrical current.

For lined pipes having relatively thick or difficulty deformable metal portions 11, the pressure obtainable by merely screwing the coupling elements 23 and 24 together may be insufficient to flare the end of the pipe. For pipes of this type auxiliary flaring means may be used with advantage. As shown in FIG. 7, for example a large flange 33 having a threaded axial bore hole can be screwed onto the male coupling member 24. A second large flange 34 is provided having a bore hole with a counter bored well therein adapted to receive the head of the flaring plug. The flanges 33 and 34 when connected as shown and drawn together by a plurality of bolts 35, can apply sufficient compression to flare the end of the pipe 10.

The flared end of pipe 10 is then positioned over the end of sleeve 13, for example, or a similar fitting having an inclined seat coated with plastic 12 adapted to fit into the flared end of the pipe. The coupling members 23 and 24 are then screwed together to complete the connection.

As will be apparent to those skilled in the art, the new close coupling method and devices may be employed in a wide variety of applications of which only a few are described here by way of example. In FIG. 1, two sections of lined pipe 10 are closely coupled by the use of the double-ended sleeve 13. In FIG. 4, a coupling device is used to connect a flared pipe 10 to a fitting 28 having a tapered end 22 provided with a plastic coating 12 and which is identical to the corresponding portion of sleeve 13. Inasmuch as the close coupling device of FIG. 4 is the same as that shown in FIG. 1, except for the differences noted below, the details of its construction have been omitted for clarity. The fitting 28 is provivded with a radial flange 29 which corresponds to split ring 15 on sleeve 13. Threads are provided on the other end of fitting 28 for connection to any desired conduit, vessel or other fitting. It will be seen, therefore, that the fitting 28 is in effect the same as one end of sleeve 13 but substitutes a different connection means at its opposite end.

Still another embodiment is illustrated in FIG. 3 wherein the sleeve 13A is in the form of an elbow but is otherwise identical to sleeve 13 in FIG. 1. As in FIG. 4 the coupling devices at each end of the elbow 13A are shown generally in broken lines since their detailed structure is identical to that shown in FIG. 1.

The degree of flare of the end of the lined pipe may vary, as desired, within reasonable limits, although it is generally preferred to flare the end about 14°, and not to exceed about 20°, since greater flare is unnecessary to achieve a good seal and may result in cracking or rupture of some of the plastic liners in present use. Suitable plastic liners include among others, "Teflon," "Saran," "Penton," polyethylene and polypropylene. The metal part of the pipe may be composed of any suitable deformable or ductile metal, for example, aluminum, copper, steel, bronze, brass, monel metal, aluminum alloys and the like. Any suitable size of pipe may be employed, although best results are obtained with pipes of ½" to 24" nominal size. The anchoring ferrules may, of course, be made in annular segments to facilitate working in cramped spaces if desired.

Although the invention has been described in detail in conjunction with the specific embodiments thereof shown in the drawings, these embodiments are merely illustrative of others that will be apparent to those skilled in the art and are not to be construed as limiting the scope of the invention which is defined in the accompanying claims.

I claim:

1. In a close coupling device which includes an externally tapered ferrule to be immovably mounted around a lined conduit adjacent an outwardly flared end thereof, first and second coupling means each having an axial passage therethrough, the axial passage of said first coupling means being tapered to receive and engage said ferrule, and means for interengaging and drawing said first and second coupling means together, the improvement which comprises: sleeve means having an axial passage therethrough and an externally tapered portion at one end thereof, said tapered portion and the axial passage of said sleeve means being provided with a chemically inert liner bonded thereon, said sleeve means having a radially projecting flange means spaced from said tapered end portion, said second coupling means having a portion closely surrounding said sleeve means and being slidably movable thereon, means forming a rearward limit of travel for said second coupling means, said second coupling means being engaged with the flange means on said sleeve means thereby limiting the forward travel thereof, the distance between the inner end of the tapered portion of said sleeve means and the rearward limit of travel less the length of the portion of the second coupling means closely surrounding the sleeve means being at least slightly greater than the distance between the inner end of the tapered portion of said sleeve means and said forward limit of travel, said tapered end portion of said sleeve means being adapted to enter the flared open end of a lined conduit and to be urged thereagainst in sealed relationship by interengaging and drawing said first and second coupling means together.

2. A coupling device according to claim 1 wherein the sleeve means has a wall thickness at least about twice the thickness of the wall of the lined conduit to be coupled, and wherein the flange means comprises an annular channel in the wall of said sleeve means and a split ring mounted in said channel and projecting radially from the wall of said sleeve means.

3. A coupling device according to claim 1 wherein said first coupling means is provided with an internal annular slot in the tapered wall thereof around said axial passage to facilitate disassembly of said coupling device by breaking vacuum existing between said coupling means and said ferrule.

References Cited

UNITED STATES PATENTS

| | | | |
|---|---|---|---|
| 980,848 | 1/1911 | Stewart | 285—353 X |
| 1,920,512 | 8/1933 | Lamont | 285—353 X |
| 2,320,812 | 6/1943 | Cowles | 285—353 X |
| 2,435,261 | 2/1948 | Woodling | 285—334.5 |
| 2,497,273 | 2/1950 | Richardson | 285—354 X |
| 2,549,741 | 4/1951 | Young | 285—334.5 |
| 3,047,937 | 8/1962 | De Vecchi | 285—55 X |

FOREIGN PATENTS

| | | |
|---|---|---|
| 451,119 | 7/1936 | Great Britain. |
| 867,569 | 5/1961 | Great Britain. |

CARL W. TOMLIN, *Primary Examiner.*

R. G. BERKLEY, *Assistant Examiner.*